(12) United States Patent
Yang (10) Patent No.: US 8,990,180 B2
(45) Date of Patent: Mar. 24, 2015

(54) METHOD, SYSTEM AND COMPUTER-READABLE RECORDING MEDIUM FOR CONTROLLING MULTIMEDIA BASED ON DISPLAY CONDITION OF CONTENTS

(75) Inventor: Byoung Seok Yang, Gyeonggi-do (KR)

(73) Assignee: NHN Corporation, Seongnam (KR)

( * ) Notice: Subject to any disclaimer, the term of this patent is extended or adjusted under 35 U.S.C. 154(b) by 1072 days.

(21) Appl. No.: 12/343,679

(22) Filed: Dec. 24, 2008

(65) Prior Publication Data

US 2009/0172037 A1 Jul. 2, 2009

(30) Foreign Application Priority Data

Dec. 27, 2007 (KR) .................. 10-2007-0139066

(51) Int. Cl.
 *G06F 7/00* (2006.01)
 *G06F 9/44* (2006.01)
(52) U.S. Cl.
 CPC .............. *G06F 8/38* (2013.01); *Y10S 707/913* (2013.01)
 USPC ........... 707/705; 707/736; 707/748; 707/913; 715/200; 715/764
(58) Field of Classification Search
 USPC .................. 707/999.104, 705, 736, 748, 913; 715/200, 764
 See application file for complete search history.

(56) References Cited

U.S. PATENT DOCUMENTS

| 7,502,808 B2* | 3/2009 | Hui et al. ................ 707/999.101 |
| 2004/0141016 A1* | 7/2004 | Fukatsu et al. ................ 345/856 |
| 2004/0186723 A1* | 9/2004 | Mizutani et al. ........... 704/270.1 |
| 2008/0025529 A1* | 1/2008 | Keohane et al. .............. 381/104 |
| 2008/0155474 A1* | 6/2008 | Duhig ........................... 715/830 |

FOREIGN PATENT DOCUMENTS

| JP | 10-097457 | 4/1998 |
| JP | 2005-092495 | 4/2005 |
| JP | 2006-011358 | 1/2006 |

* cited by examiner

*Primary Examiner* — Hosain Alam
*Assistant Examiner* — Jieying Tang
(74) *Attorney, Agent, or Firm* — Greer Burns & Crain Ltd.

(57) ABSTRACT

A method for controlling multimedia data corresponding to at least one multimedia area included in content created by a content creator based on the state in which the content is displayed through a screen of a user terminal, includes the steps of: (a) creating information on the multimedia area to activate a specific multimedia data among the multimedia data if the specific multimedia area among the all the areas included in the content is displayed on the screen of the user terminal; (b) recording the content in connection with the information on the multimedia area; and (c) providing the recorded content to the user terminal if a request for viewing the content is received from the user terminal. With this method, the user may create the content systematically.

15 Claims, 11 Drawing Sheets

METHOD, SYSTEM AND COMPUTER-READABLE RECORDING MEDIUM FOR CONTROLLING MULTIMEDIA BASED ON DISPLAY CONDITION OF CONTENTS

CROSS-REFERENCE TO RELATED APPLICATION

This application claims under 35 U.S.C. §119(a) the benefit of Korean Patent Application No. 10-2007-0139066 filed Dec. 27, 2007, the entire contents of which are incorporated herein by reference.

TECHNICAL FIELD

The present invention relates to a method, a system and a computer readable recording medium for controlling multimedia data based on the displayed condition of contents, in which at least one area can be set for multimedia data included in contents to be played and the multimedia data included in a specific area can be played if the specific area is displayed on a screen of a terminal.

BACKGROUND ART

With the recent wider-spread use of the Internet, the amount of content distributed by traditional content providers including Internet portals or Internet service providers is on the rise. An increasing number of users actively create and provide contents rather than passively acquire information from traditional content providers. In other words, individual users are recently creating and distributing contents such as web documents, news articles, images, moving pictures and media information on the Internet, which had been mainly provided only by Internet portals, etc. This phenomenon recently became more apparent thanks to the popularity of the wide spread user created content (UCC) culture and the web portals for blogs or homepages which offer several functions to enable users to create content more easily and conveniently (hereinafter referred to as "service providers").

In general, such UCC includes not only data in the form of text but also in the form of audio data, image data, moving picture data or media data combining such data (collectively "multimedia data") created by a user. However, if a plurality of pieces of multimedia data are included in one content, the users have suffered the following difficulties:

First, because it is decided whether each multimedia data included in a webpage starts playing or not at the time of loading the webpage in general, a multiple number of multimedia data included in the webpage often start to play at the same time or, in other case, a user had to play each multimedia data one by one.

Further, according to the prior art, it was not easy to set up a connection between text data and multimedia data or between multiple multimedia objects included in the content. For instance, if a user intends to insert audio data matched to each image (or text) included in a content, the user had to create the content in a way to add an audio data player just before or after each image (or text). Accordingly, it was unclear which image (or text) is connected with the added audio data, and even if each image (or text) is displayed on the screen of a user terminal, the play of the audio data corresponding to the image (or text) was not guaranteed.

The above information disclosed in this Background section is only for enhancement of understanding of the background of the invention and therefore it may contain information that does not form the prior art that is already known in this country to a person of ordinary skill in the art.

SUMMARY

It is, therefore, an object of the present invention to solve the above-mentioned problems of the prior art.

Moreover, it is another object of the present invention to control, by referring to a content area displayed on the screen of a user terminal, the multimedia data corresponding to the displayed area.

Furthermore, it is still another object of the present invention to easily set up a connection between text data and multimedia data and/or between multimedia objects included in the content.

In addition, it is still yet another object of the present invention to satisfy the needs of users by playing a specific multimedia data which is seen by the user if a plurality of multimedia data included in the content are displayed simultaneously via the screen of the terminal.

In accordance with one aspect of the present invention, there is provided a method for controlling multimedia data corresponding to at least one multimedia area included in content created by a content creator, including the steps of: (a) creating information on the multimedia area to activate a specific multimedia data among the multimedia data if the specific multimedia area among the all the areas included in the content is displayed on the screen of the user terminal; (b) recording the content in connection with the information on the multimedia area; and (c) providing the recorded content to the user terminal if a request for viewing the content is received from the user terminal.

In accordance with another aspect of the present invention, there is provided a system for controlling multimedia data corresponding to at least one multimedia area included in content created by a content creator, including: a multimedia area setting part for creating information on the multimedia area to activate a specific multimedia data among the multimedia data if the specific multimedia area among the all the areas included in the content is displayed on the screen of the user terminal; a content registering part for recording the content in connection with the information on the multimedia area; and a content viewing part for providing the recorded content to the user terminal if a request for viewing the content is received from the user terminal.

In accordance with still another aspect of the present invention, there is provided a method for controlling multimedia data corresponding to at least one multimedia area included in content created by a content creator, including the steps of: (a) monitoring a state in which the content is displayed in display area of the browser of the user terminal; (b) generating a control signal regarding each multimedia data connected with each multimedia area depending on whether each multimedia area included in the content is included in the display area of the browser; and (c) controlling the multimedia data by the control signal.

In accordance with yet still another aspect of the present invention, there is provided a computer-readable media having stored thereon a computer program that, when executed by one or more processors, causes the one or more processors to perform acts including: creating information on the multimedia area to activate a specific multimedia data among the multimedia data if the specific multimedia area among the all the areas included in the content is displayed on the screen of the user terminal; recording the content in connection with the information on the multimedia area; and providing the recorded content to the user terminal if a request for viewing the content is received from the user terminal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

The Configuration of the Whole System

Figure 1:
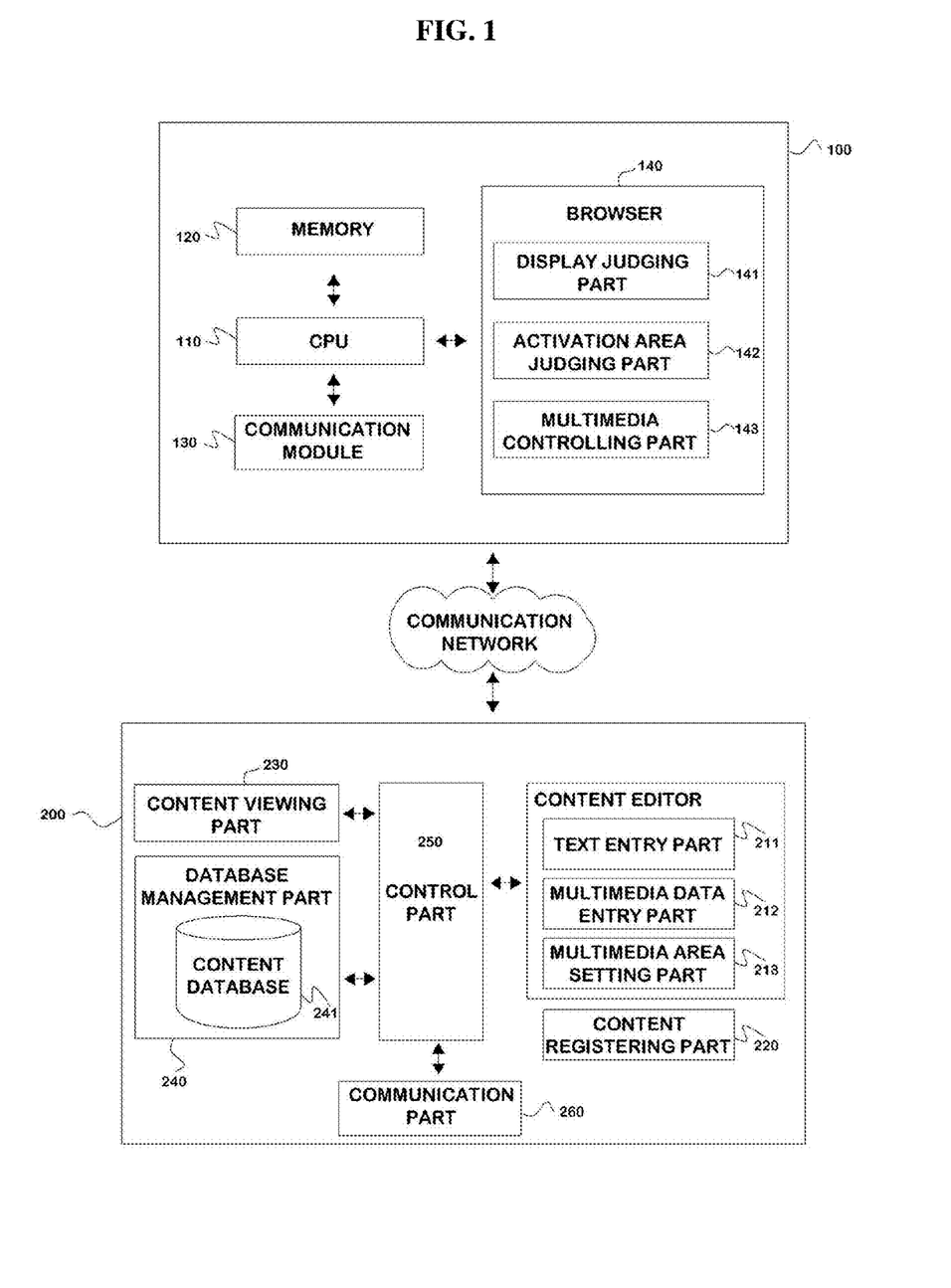
FIG. 1 illustrates the configuration of a system for controlling multimedia data based on a display state of content in accordance with one example embodiment of the present invention.

FIG. 1 illustrates the configuration of a system for controlling multimedia data based on a display state of content in accordance with an embodiment of the present invention.

Referring to FIG. 1, the system includes a user terminal 100 and a content server 200. The user terminal 100 is a digital device which has a function to allow a user who wants to create and view content to access and communicate with the content server 200 through a communication network. Herein, digital devices with computing capacity with a microprocessor and memory, such as personal computer (e.g., desktop computer, laptop computer, etc.), workstation, PDA, web pad, or mobile phone, may be adopted as the user terminal 100 in accordance with the prevent invention.

The user terminal 100 includes a central processing unit (CPU) 110, a memory 120 and a communication module 130, and it may further include a browser 140, an application program to request data to, e.g., a remote computer connected through the communication network.

Preferably, the browser 140 may be a well-known web browser such as Internet Explorer, Fire Fox or Mozilla. It may additionally include a display judging part 141, an activation area judging part 142 and a multimedia controlling part 143 to control multimedia data based on the display state of content.

The display judging part 141 may perform a function to judge a specific area which is being displayed on the screen of the terminal 100 among the entire area of webpage or content downloaded by the browser 140.

The activation area judging part 142 may perform a function to determine an activation area among the areas displayed on the screen of the terminal 100. The term "activation area" means a display area connected with a specific multimedia data in case where the specific multimedia data included in content is determined to be displayed according to designated conditions.

The multimedia controlling part 143 may carry out a function such as play, stop and control of the volume.

The content server 200 communicates with the user terminal 100, etc. through the communication network and receives content created by the user terminal 100, etc. to thereby record and manage the content.

The content server 200 may include a content editor 210, a content registering part 220, a content viewing part 230, a database management part 240, a control part 250, a communication part 260, etc. At least one of them may be program modules which are communicable with the content server 200. The program modules may be included in the content server 200 in the form of an operating system, an application program module and other program module, and may be physically recorded in several memory devices known in the art. Moreover, such program modules may be recorded in the remote-controlled memory device communicable with the content server 200. On the other hand, they may include a routine, a sub-routine, a program, an object, a component and data structure which perform particular duties or execute specific abstract data types as described below, but they are not limited thereto.

Herein, the communication network may be configured regardless of communication types such as wired or wireless communication, and may include local area network (LAN), metropolitan area network (MAN) and wide area network (WAN). More desirably, the communication network in the present invention may be World Wide Web (WWW).

The content editor 210 may provide a toolbar to the user terminal 100 to help a user to create content. To do this, the content editor 210 may include a text entry part 211, a multimedia data entry part 212, a multimedia area setting part 213, etc.

The text entry part 211 may perform a function to receive text data to be included in content which the user wants to create.

The multimedia data entry part 212 may carry out a function to receive multimedia data to be included in the content which the user wants to create.

The multimedia area setting part 213 may execute a function to create information on the area of multimedia data included in the content. In brief, in case a specific area among the multimedia areas included in the content is displayed through the screen of the user terminal 100, the multimedia area setting part 213 creates the information on the area of multimedia data so as to activate the specific multimedia data. Such area information may be inserted in the content in the form of a program code and such program code may include a multimedia identifier for identifying multimedia data and an area identifier for specifying the multimedia area. The multimedia identifier and the area identifier in connection with the multimedia identifier may be inserted in the content. Such program code may be implemented by using at least one of a markup language and a scripting language.

The content registering part 220 may perform a function to record the content created by using the content editor 210 or collected through a variety of routes in a content database 241 by connecting the content with the area information.

The content viewing part 230 may receive from, e.g., the user terminal 100 a request for viewing the content recorded in the content server 200 and provides the requested content to the user terminal 100, etc.

The database management part 240 may carry out a function to write data to the database of the content server 200 or read a number of data recorded in the database of the content server 200 to enable the content registering part 220 and the content viewing part 230 to perform their functions.

The database management part 240 may include the content database 241 which records the information on content therein. The content database 241 may include, e.g., content identifier, user information, text data, multimedia data or route through which such multimedia data is obtainable, area information of the multimedia data included in the content, a time when the content was created.

In a modified embodiment, an additional database can be used. In another modified embodiment, the information recorded in the content database 241 can be divided into separate databases.

The control part 250 may perform a function to control the flow of data among the content editor 210, the content registering part 220, the content viewing part 230, the database management part 240 and the communication part 260.

The communication part 260 may execute a function to help the content server 200 to communicate with an external device such as the user terminal 100, etc.

Setting of Play Area of Multimedia Data

In accordance with an example embodiment of the present invention, the multimedia data may be recorded in connection with a specific area or object ("the play area") in order that the multimedia data is played if the multimedia data included in the content is displayed on the display of the user terminal 100 while satisfying the fixed conditions.

Figure 2A:
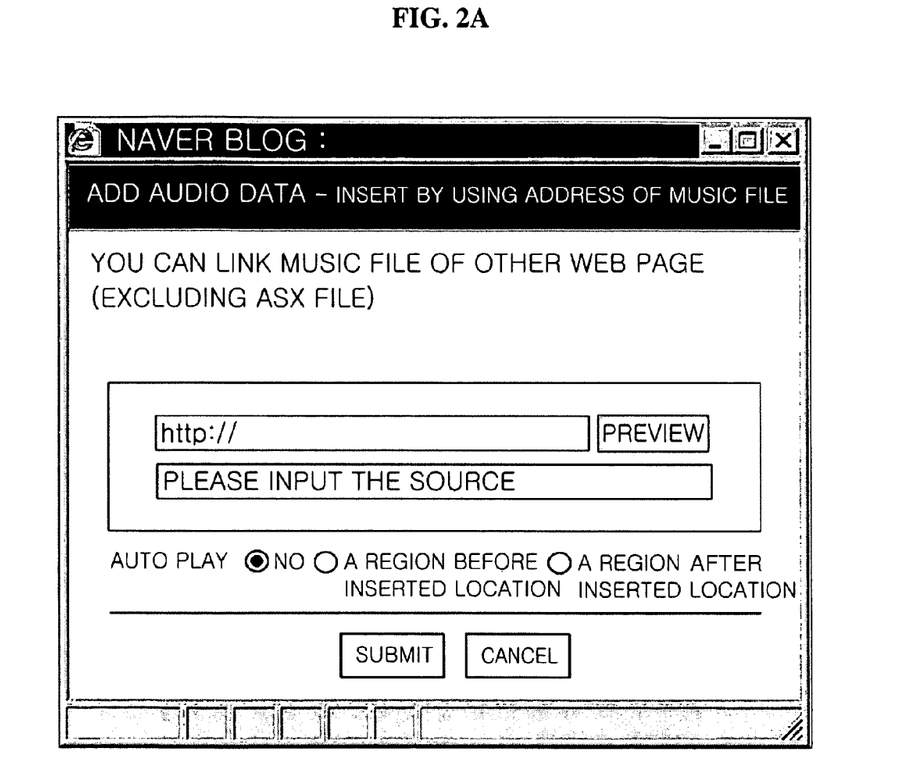
FIGS. 2A and 2B illustrates how a play area of multimedia data is designated by a user.
Figure 2B:
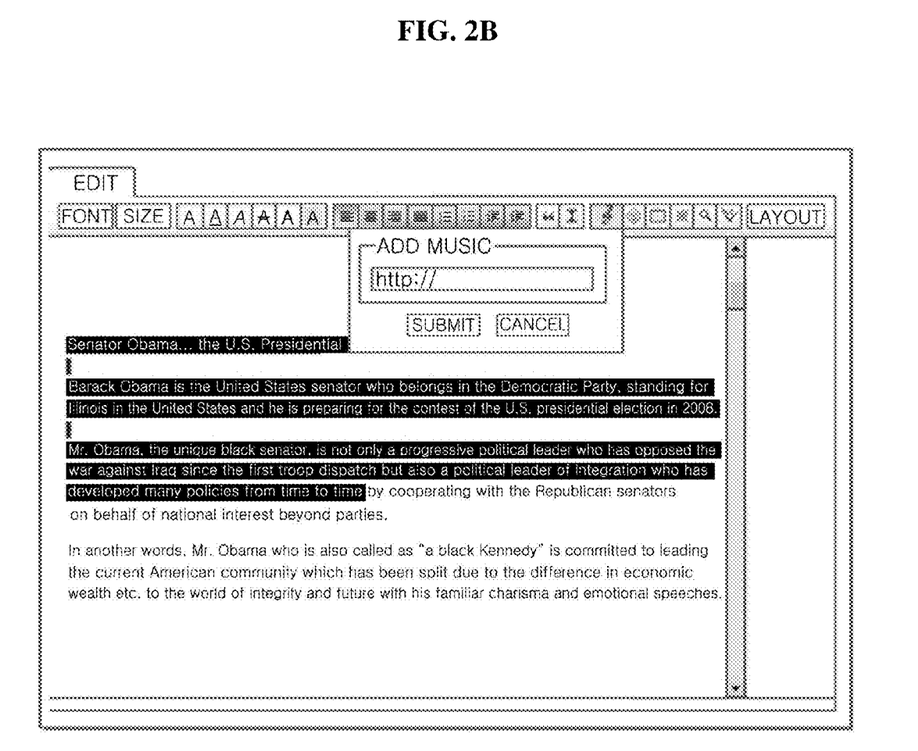

FIGS. 2A and 2B illustrates how a play area of multimedia data is designated by a user.

By referring to FIG. 2A, the user may add audio data to the content while designating as the play area a region before or after the location where the audio data is inserted. If the area before the location is designated, a region from a location where other audio data was inserted immediately before the current audio data is inserted (from the beginning of the content, if there is no audio data previously added) to the current location may be designated as the play area. This may be similarly applied to a case in which the area after the current location is designated, detailed explanation thereabout being omitted.

By referring to FIG. 2B, the user may designate, as a play area of audio data etc., part of the content which is being created by using the content editor 210. As such, if a specific area which is designated by the user is displayed in the user terminal 100, such audio data, etc. will start being played.

Figure 3:
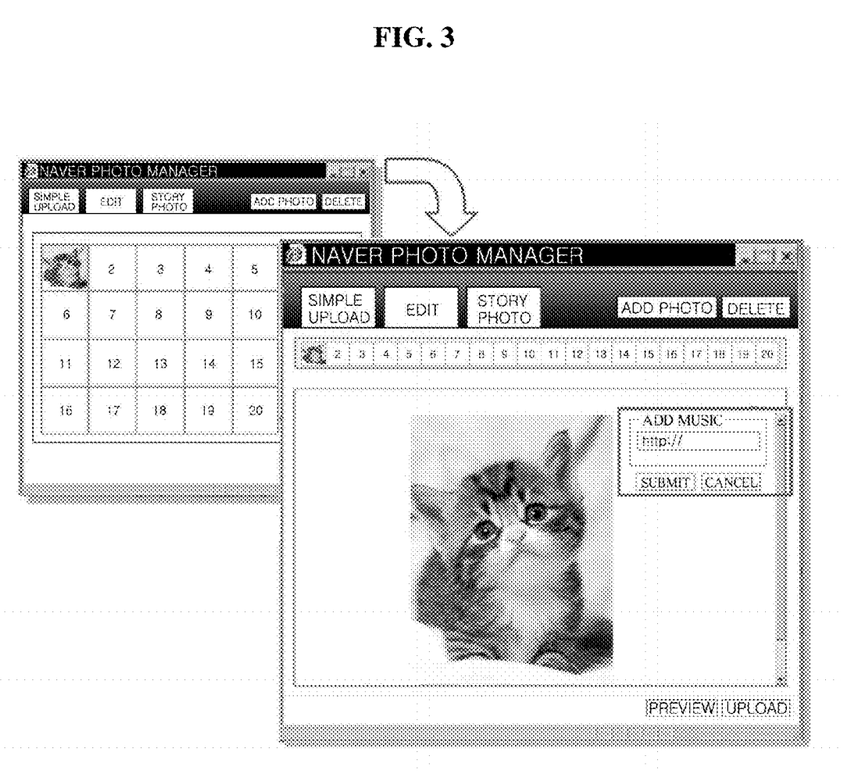
FIG. 3 demonstrates a method for connecting the play area of multimedia data with a specific object inserted in content.

FIG. 3 demonstrates a method for connecting the play area of multimedia data with a specific object inserted in content. By referring to FIG. 3, it is possible to connect the play area of multimedia data and the specific object in order that each audio data, etc. related to each picture is played if each picture included in the content is activated by the user's scroll operation, etc.

As such, the multimedia area setting part 213 may link each multimedia data with the designated play area and may allow the content registering part 220 to record it in the content database 241.

The method for linking the play area with the multimedia data is not limited to the above-described one, however.

In accordance with an example embodiment of the present invention, the designated play area may be inserted in the content as tag information which represents the property of multimedia data. Tables 1 to 3 illustrate the information on the play area of the multimedia data inserted in HTML tag information of the content corresponding to FIGS. 2A, 2B and 3, respectively.

TABLE 1 where a play area is set based on the
location(s) where the multimedia data is inserted <embed src=soundfile.wma scope=front autostart=true>

TABLE 2 where a specific region
designated by a user is set as a play area

<user-region id=region_1> <b>Senator Obama . . . Presidential Candidate</b><p>Barack Obama is the United States senator who belongs in the Democratic Party, standing for Illinois . . . from time to time,</user-region> by cooperating with Republican senators . . .

TABLE 3 where an image object is set as a play area

<img src=img.jpg soundfile=soundfile.wma>

Figure 4:
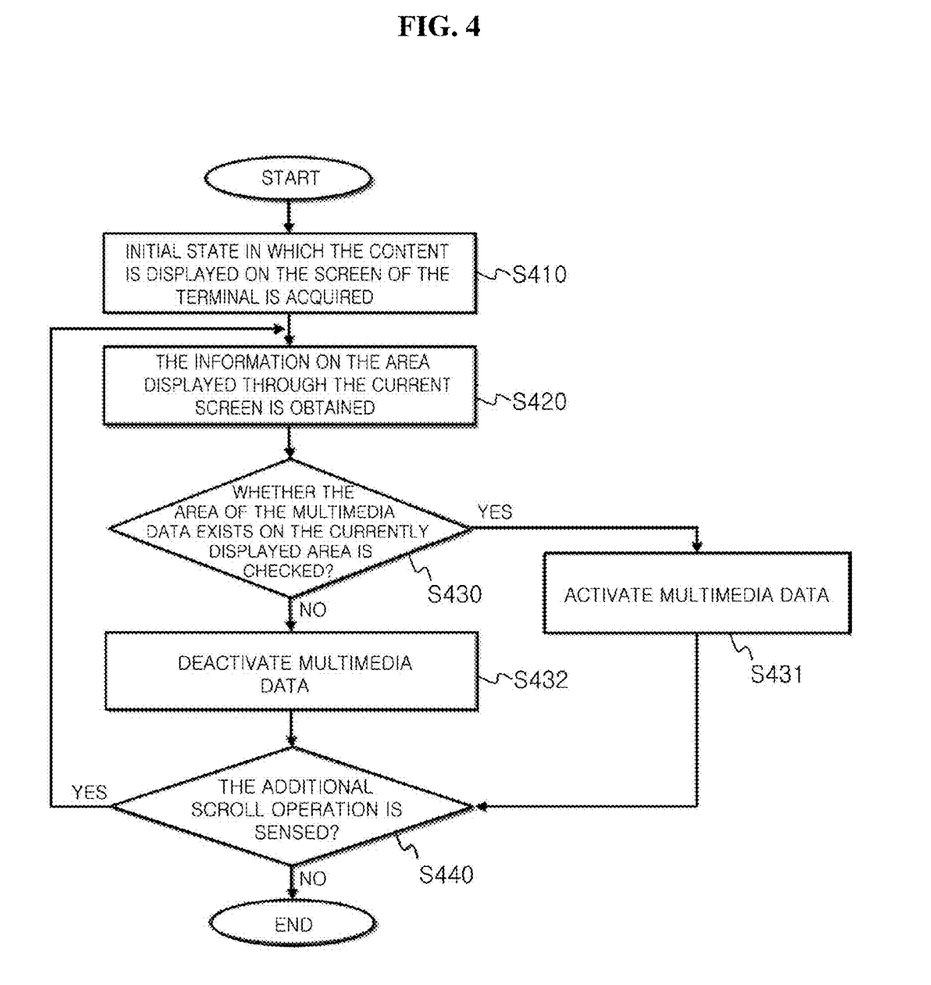
FIG. 4 is a flow chart for inserting in content information on the play area in the form of a program code such as a scripting language.

In accordance with another example embodiment of the present invention, the information on the designated play area may be inserted in the content in the form of a program code such as scripting language, etc., and FIG. 4 is a diagram illustrating the flow chart of the program code inserted.

By referring to FIG. 4, initial information, i.e., the content displayed on the screen of the terminal 100 initially (after downloaded from the content server 200 by the terminal 100) is acquired (S410).

Next, the information on the area displayed through the current screen is obtained by referring to the information on the screen scroll state of the user, the setting state of the browser and the like (S420).

The method for obtaining the scrolled location of the screen may be performed by using a programming method known in the art such as JavaScript. Table 4 demonstrates the method for obtaining a scrolled location by using JavaScript.

TABLE 4

```
var getNowScroll = function( ){
var de = document.documentElement;
var b = document.body;
var now = { };
now.X = document.all ? (!de.scrollLeft ? b.scrollLeft : de.scrollLeft) :
(window.pageXOffset ? window.pageXOffset : window.scrollX);
now.Y = document.all ? (!de.scrollTop ? b.scrollTop : de.scrollTop) :
(window.pageYOffset ? window.pageYOffset : window.scrollY);
return now;
}
```

Next, whether the area of the multimedia data exists on the currently displayed area is checked (S430), to thereby activate multimedia data displayed on the current screen (S431) and deactivate the multimedia data which is not displayed on the current screen (S432).

Whether a specific multimedia data or multimedia area is displayed on the current screen or not may be determined by using a scheme for calculating the absolute coordinate of components included in the content and judging whether such components are in the area displayed in such current screen or not. Table 5 illustrates the scheme for calculating the absolute coordinate of a component included in the content by using JavaScript.

TABLE 5

```
function GetAbsPosition(object) {
var position = new Object;
position.x = 0; position.y = 0;
if( object ) {
position.x = object.offsetLeft; position.y = object.offsetTop;
if( object.offsetParent ) {
var parentpos = GetAbsPosition(object.offsetParent);
position.x += parentpos.x; position.y += parentpos.y;
}
}
position.cx = object.offsetWidth; position.cy = object.offsetHeight;
return position;
```

If the above-mentioned process may be repeated from Step S420 if the additional scroll operation of the user is sensed (S440).

Figure 5A:
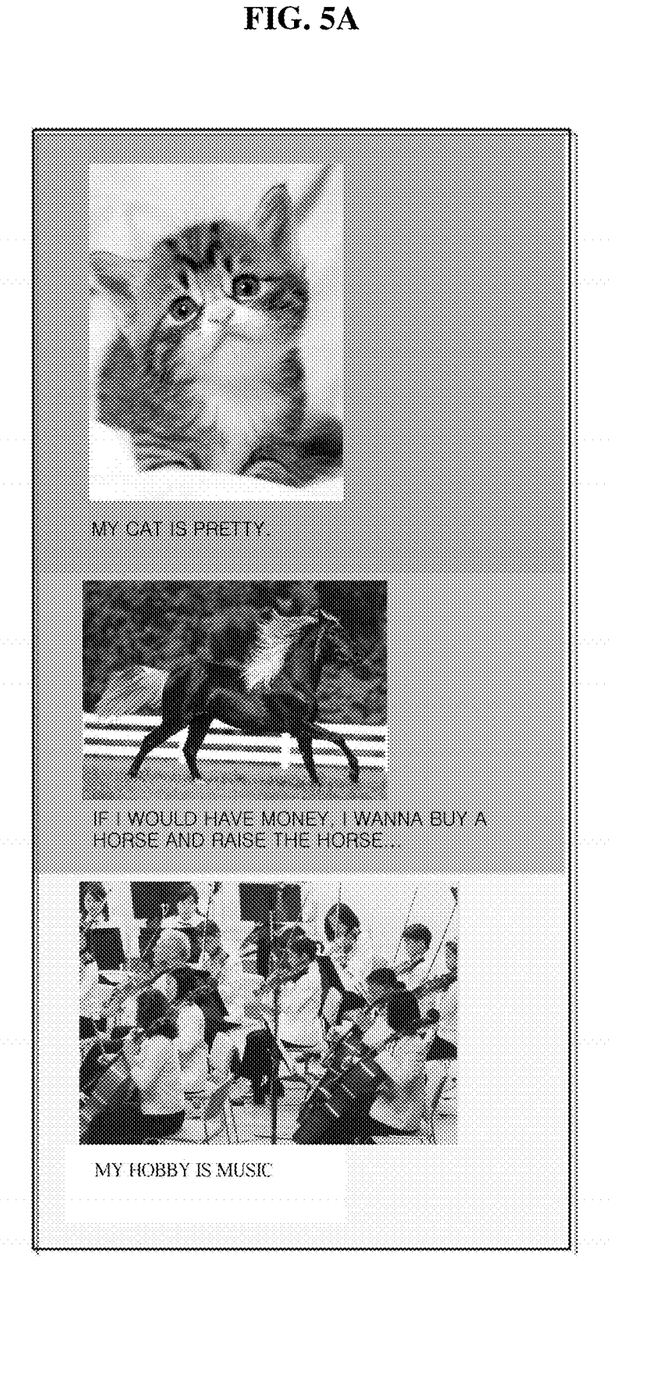
FIGS. 5A to 5C illustrate one content area being divided into play areas of multiple multimedia objects and respective multimedia data being played depending on the content area on the screen of the user terminal.
Figure 5B:
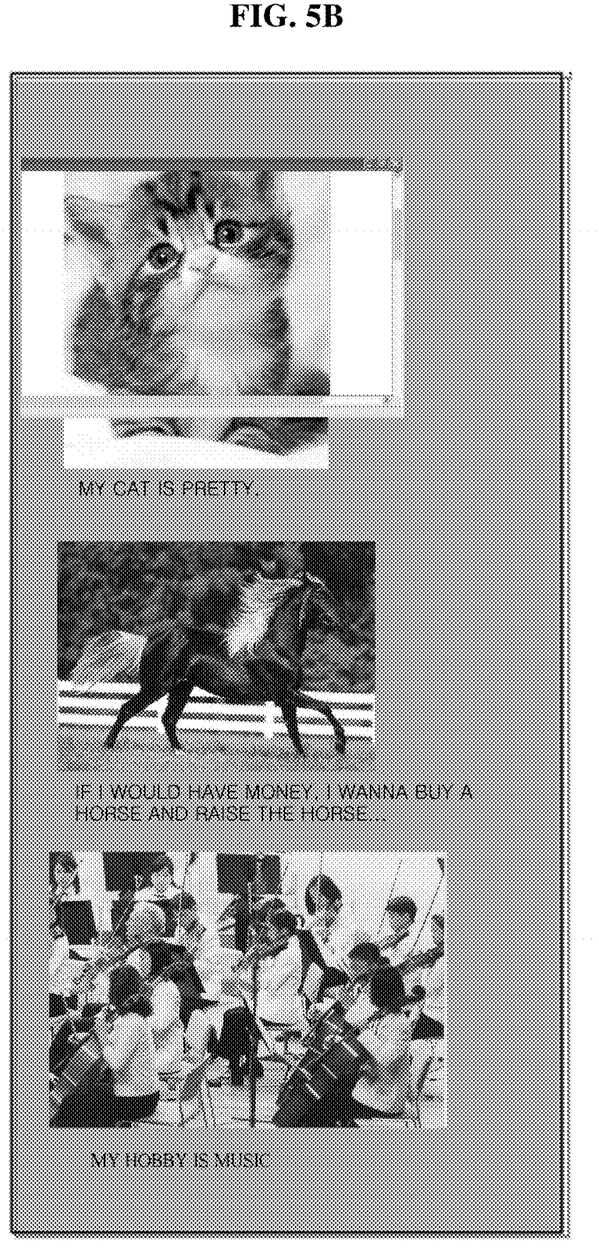
Figure 5C:
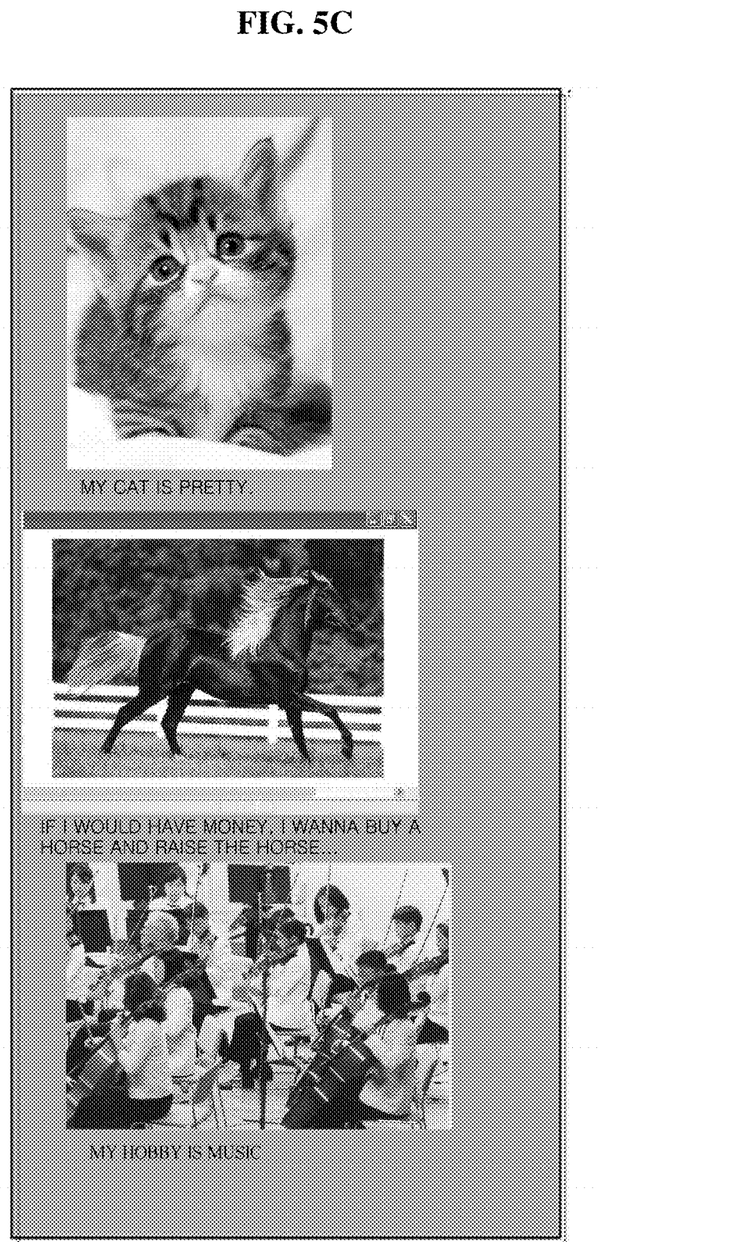

FIGS. 5A to 5C illustrate one content area being divided into play areas of multiple multimedia objects and respective multimedia data being played depending on the content area on the screen of the user terminal.

By referring to FIG. 5A, the entire area of the content is divided into three play areas of audio data.

By referring to FIGS. 5B and 5C, when a user requests the view of the content such as FIG. 5A and scrolls the screen, the areas of the content being displayed on the screen are changed. When the screen is scrolled and the content areas displayed on the screen are changed, multimedia data which is played is also changed. For instance, because the area showing the image of a cat is displayed on the screen in case of FIG. 5B, the audio data associated with the cat's sound may be played, and in case of FIG. 5C where the area showing the image of a horse is displayed on the screen, the audio data associate with the sound of the horse's hoofs may be played.

By referring to FIGS. 2, 3 and 5, the cases where audio data is selectively played are described above, but the played data is not limited to the audio data and this may be applied to a variety of multimedia such as flash and moving picture.

Play of the Multimedia Data

At the request of the user to view the recorded content, the content viewing part 230 in accordance with an example embodiment of the present invention may obtain the content from the content database 241 and provide it to the user terminal 100.

The display judging part 141 may obtain the information on which area of the content acquired from the content server 200 is being displayed on the screen of the browser. This may be implemented by using the programming methods known in the art such as a method for obtaining absolute coordinate of the content in the frame which is supported in a web program language including JavaScript as mentioned above, or may be obtained by using the information on the screen rendering of the browser itself.

The multimedia controlling part 143 may play the multimedia data or control the multimedia data such as the suspension of the play thereof by receiving the display information from the display judging part 141 and referring to at least part of the information on the play area included in the content in the form of a scripting language or HTML code mentioned above. As the case may be, the information on the play area may not exist in the content, in which case the multimedia data may be controlled by using the information on the display received from the display judging part 141.

Judgment of Activation Areas

The technology may be easily applied to the case in which only one piece of multimedia data is displayed on the user terminal 100, but if a plurality of pieces of multimedia data are displayed at the same time, the technology is difficult to be adopted. To solve the problem, we will explain how to decide which multimedia data will be played first in the priority order if multiple pieces of multimedia data are shown in the user terminal 100 at the same time.

In deciding which multimedia data must be played first among a lot of multimedia data displayed on the screen, a variety of cases depending on the arrangement and location of such multiple data, etc. can be considered.

Figure 6A:
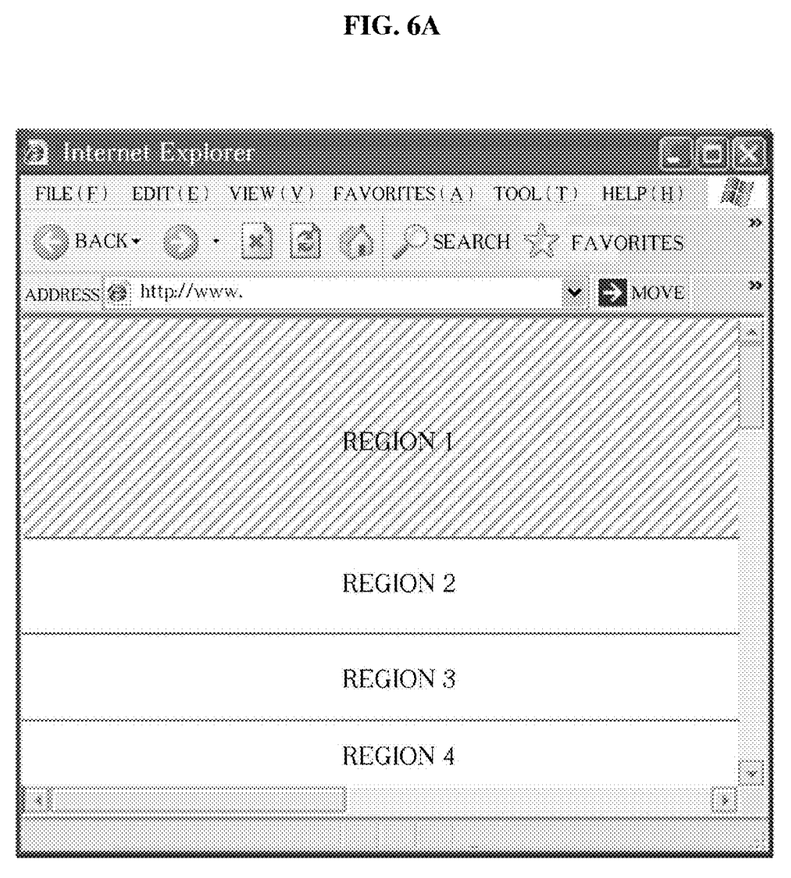
FIG. 6A to FIG. 6C illustrate a method to determine how multimedia data is activated in case multiple multimedia areas are displayed on the screen at the same time.

The activation area judging part 142 may receive the display information from the display judging part 141, and multimedia data which occupies the largest ratio (or area), based on the received display information, may be judged as the activation area. In case of FIG. 6A, the multimedia data in Area 1 which occupies the largest area in the current browser will be played.

Figure 6B:
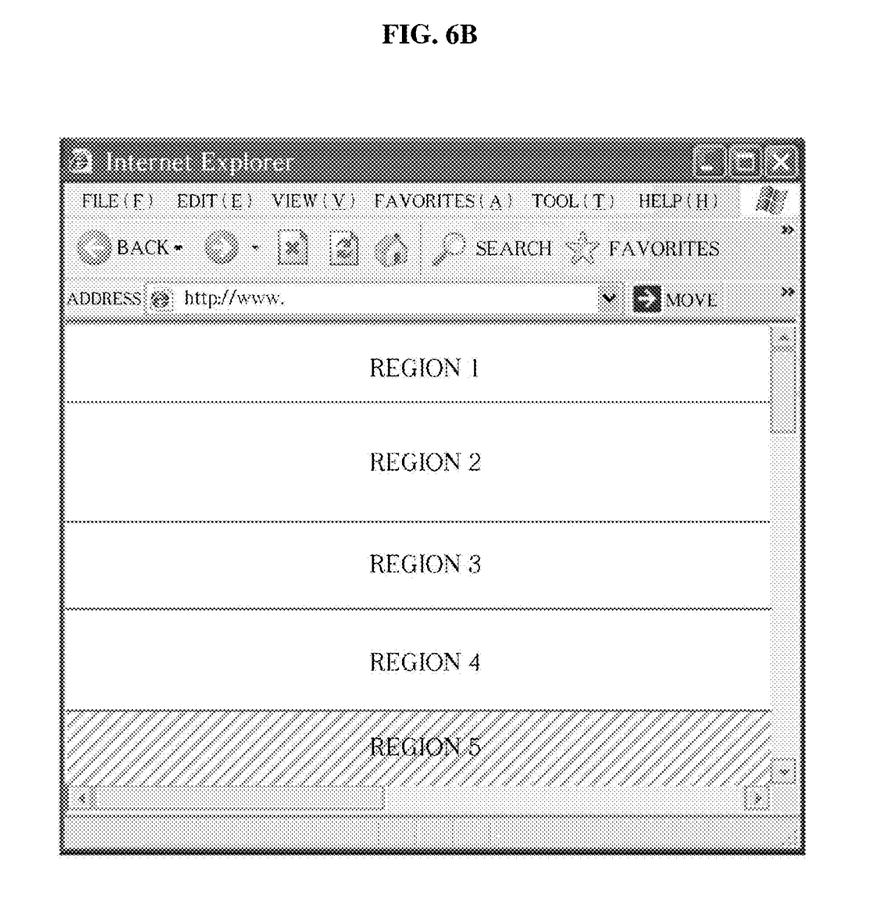

Furthermore, the activation area judging part 142 may receive the display information from the display judging part 141 and the play area of the multimedia data newly entered in the screen, based on the received display information, may be determined as the activation area. In other words, FIG. 6B illustrates the state in which Area 5 is newly entered on the screen when the user scrolls down the screen. In this case, the newly entered Area 5 may be played, and the play of the multimedia data of Area 4 (which have been played until the Area 5 is newly entered) may be suspended.

Figure 6C:
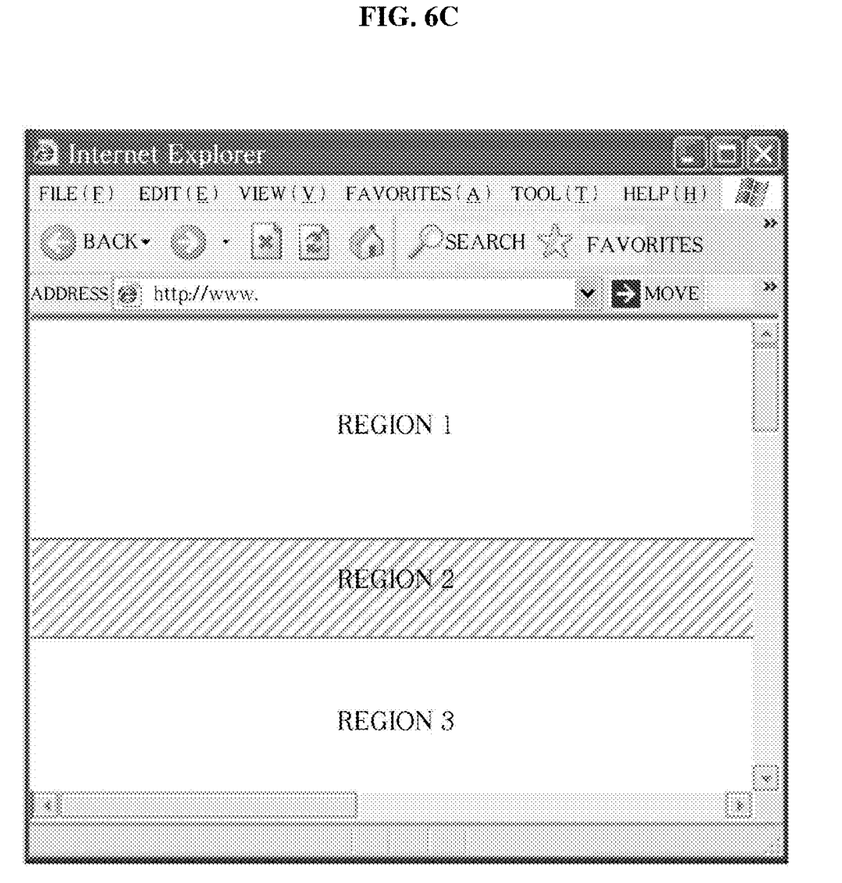

In addition, the activation area judging part 142 may receive the display information from the display judging part 141, and the play area located in the center of the browser may be judged as the activation area, based on the received display information. FIG. 6C demonstrates the state of Area 2 located on the center of the browser screen when the user scrolls down the screen, in which case the multimedia data of Area 2 located in the center may be played and, at the same time, the play of the multimedia data of Area 1 which was played when the Area 1 was located in the center of the screen may be suspended.

The present invention is not limited to the above-mentioned methods for playing a plurality of multimedia data on the same screen and a variety of examples may be introduced and applied for the invention.

Application to Comics Service

The methods for playing the multimedia may be similarly applied to a comics service.

For example, a menu called "Toon" among the menu of the Smart Editor, a kind of content creator provided by NHN Corp. is provided, and according to the menu "Toon," it provides a function to allow a user to draw a cartoon and enter on the Smart Editor. In accordance with the present invention, each object (e.g., a cut or a frame) of cartoons provided by the "Toon" service may have a variety of multimedia data such as BGM inserted therein. According to the present invention, it is possible to insert appropriate BGM per cut or frame, thereby contributing to create a variety of UCCs.

More specifically, there may be a variety of examples of interfaces to link multimedia to a specific object of a cartoon. For example, it is possible for a log-in user to link the music he or she purchased to the content. It is also possible to link it to a specific URL of a content server including other websites, etc.

As described above, the present invention provides advantages including the following: By referring to the specific area of the content displayed on the screen of the user terminal, the multimedia data corresponding to the specific area may be provided. Because the user who creates content easily sets the connection between text data and multimedia data or between multimedia data included in the content, the user may create the content systematically. When a number of multimedia data are displayed at the same time on the screen of the terminal, only a particular multimedia data the user is watching may be played, thereby preventing inconvenience caused by the play of the multiple multimedia data at the same time or the play of multimedia data the user is not watching.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for linking multimedia data to a corresponding multimedia play area included in content created by a content creator, comprising:

providing a user interface including a data input box to receive information of a source for first multimedia data;

receiving the information of the source for the first multimedia data entered by a user into the data input box;

designating a first multimedia play area in a specified area of content created by the user, and linking the first multimedia data with the designated multimedia play area;

creating area activation information of the first multimedia play area to activate the first multimedia data in response to the first multimedia play area included in the content being displayed on a screen of a user terminal;

inserting the area activation information of the first multimedia area in the content in the form of a program code;

recording the content including the first multimedia play area in a database; and providing the recorded content to the user terminal in response to a request for viewing the content;

wherein the first multimedia data is activated when the first multimedia play area included in the recorded content and linked to the first multimedia is displayed on the screen of the user terminal; and wherein the program code comprises a multimedia identifier to identify the first multimedia data and an area identifier to specify the first multimedia play area, and the program code is inserted into the content with the multimedia identifier linked with the area identifier.

2. The method of claim 1, wherein the program code comprises a code for performing a function to deactivate multimedia data which is not displayed on the screen of the user terminal.

3. The method of claim 1, wherein the program code is configured to play specific multimedia data corresponding to a specific multimedia area having a priority set by a priority rule, in response to multiple multimedia areas included in the content being displayed at the same time.

4. The method of claim 3, wherein the priority rule includes one or more of:

a rule that the priority is determined by referring to a ratio of area which is occupied by each multimedia area displayed on the screen of the user terminal;

a rule that the priority is determined by referring to information regarding the multimedia area displayed on a specific location on the screen of the user terminal; and a rule that the priority is determined by referring to information regarding the multimedia area which newly appears on the screen of the user terminal.

5. The method of claim 1, wherein the area activation information of the first multimedia area comprises a specific area in which an object included in the content is activated.

6. A system for linking multimedia data to a corresponding multimedia play area included in content created by a content creator, comprising:

a computer processor;

a content editor, using the computer processor, configured to provide a data input box to receive information of a source for first multimedia data entered into the data input box by a user;

a multimedia area setting part configured to designate a first multimedia play area in a specified area of content created by the user, link the first multimedia data with the designated multimedia play area, create area activation information of the first multimedia play area to activate the first multimedia data retrieved from the source among multimedia data in response to the first multimedia play area included in the content being displayed on a screen of a user terminal, and insert the area activation information of the first multimedia area in the content in the form of a program code;

a content registering part configured to record the content including the first multimedia play area in a database; and a content viewing part configured to provide the recorded content to the user terminal in response to a request for viewing the content being received from the user terminal;

wherein the first multimedia data is activated when the first multimedia play area included in the recorded content and linked to the first multimedia is displayed on the screen of the user terminal; and wherein the program code comprises a multimedia identifier to identify the first multimedia data and an area identifier to specify the first multimedia play area, and the program code is inserted into the content with the multimedia identifier linked with the area identifier.

7. The system of claim 6, wherein the program code comprises a code to deactivate multimedia data which is not displayed on the screen of the user terminal.

8. The system of claim 6, wherein the program code is configured to play specific multimedia data corresponding to a specific multimedia area having a priority set by a priority rule, in response to multiple multimedia areas included in the content being displayed at the same time.

9. The system of claim 8, wherein the priority rule comprises one or more of:
   a rule that the priority is determined by referring to a ratio of area which is occupied by each multimedia area displayed on the screen of the user terminal;
   a rule that the priority is determined by referring to information regarding the multimedia area displayed on a specific location on the screen of the user terminal; and
   a rule that the priority is determined by referring to information regarding the multimedia area which newly appears on the screen of the user terminal.

10. A method for linking multimedia data to corresponding at least one multimedia play area included in content created by a content creator, comprising:
    providing a user interface including a data input box to receive information of a source for the multimedia data;
    receiving the information of the source for the multimedia data entered by a user into the data input box;
    designating a multimedia play area in a specified area of content created by the user, and linking the multimedia data with the designated multimedia play area;
    monitoring a state in which the content is displayed in a display area of a browser of a user terminal;
    generating a control signal regarding each piece of multimedia data connected with each multimedia play area, depending on whether each multimedia play area included in the content is included in the display area of the browser;
    controlling each piece of multimedia data by the control signal to play specific multimedia data corresponding to a specific multimedia play area; and
    in response to a detection that multiple multimedia play areas included in the content are displayed at the same time, playing a piece of multimedia data having a priority set by a priority rule, out of multiple pieces of multimedia data corresponding to the multiple multimedia play areas,
    wherein the multimedia play area is obtained by referring to a program code included in the content, the program code comprising a multimedia identifier to identify a first multimedia data and an area identifier to specify a first multimedia play area, and the program code is inserted into the content with the multimedia identifier linked with the area identifier; and
    wherein the priority rule comprises one or more of:
    a rule that the priority is given to a piece of multimedia data of which a multimedia play area displayed on the display area of the browser is larger than any other multimedia play area displayed on the display area of the browser; and
    a rule that the priority is given to a piece of multimedia data corresponding to a multimedia play area that newly appears on the display area of the browser.

11. The method of claim 10, wherein the control signal is configured to cause a first multimedia data to play in response to a first multimedia play area being included in the display area of the browser and to stop the first multimedia data from playing in response to the first multimedia area being not included in the display area.

12. The method of claim 10, wherein the monitoring comprises monitoring whether or not the display area of the browser is scrolled by the user of the terminal.

13. The method of claim 12, wherein, in response to the detection that the multiple multimedia play areas included in the content are displayed at the same time in the display area of the browser, the controlling comprises: determining which multimedia data is to be controlled among the multiple multimedia data; and producing the control signal associated with multimedia data which is determined to be controlled.

14. The method of claim 10, wherein playing the piece of multimedia data having the priority comprises stopping the multiple pieces of multimedia data from playing other than the piece of multimedia data.

15. A non-transitory computer-readable media having stored thereon a computer program for linking multimedia data to a corresponding multimedia play area included in content created by a content creator, the program, when executed by one or more processors, causes the one or more processors to perform acts comprising:
    providing a user interface including a data input box to receive information of a source for first multimedia data;
    receiving the information of the source for the first multimedia data entered by a user into the data input box;
    designating a first multimedia play area in a specified area of content created by the user, and linking the first multimedia data with the designated multimedia play area;
    creating area activation information of the first multimedia play area to activate the first multimedia data in response to the first multimedia play area included in the content being displayed on a screen of a user terminal;
    inserting the area activation information of the first multimedia area in the content in the form of a program code;
    recording the content including the first multimedia area in a database; and
    providing the recorded content to the user terminal in response to a request for viewing the content being received from the user terminal;
    wherein the first multimedia data is activated when the first multimedia play area included in the recorded content and linked to the first multimedia is displayed on the screen of the user terminal; and
    wherein the program code comprises a multimedia identifier to identify the first multimedia data and an area identifier to specify the first multimedia play area, and the program code is inserted into the content with the multimedia identifier linked with the area identifier.

* * * * *